Figure 6:
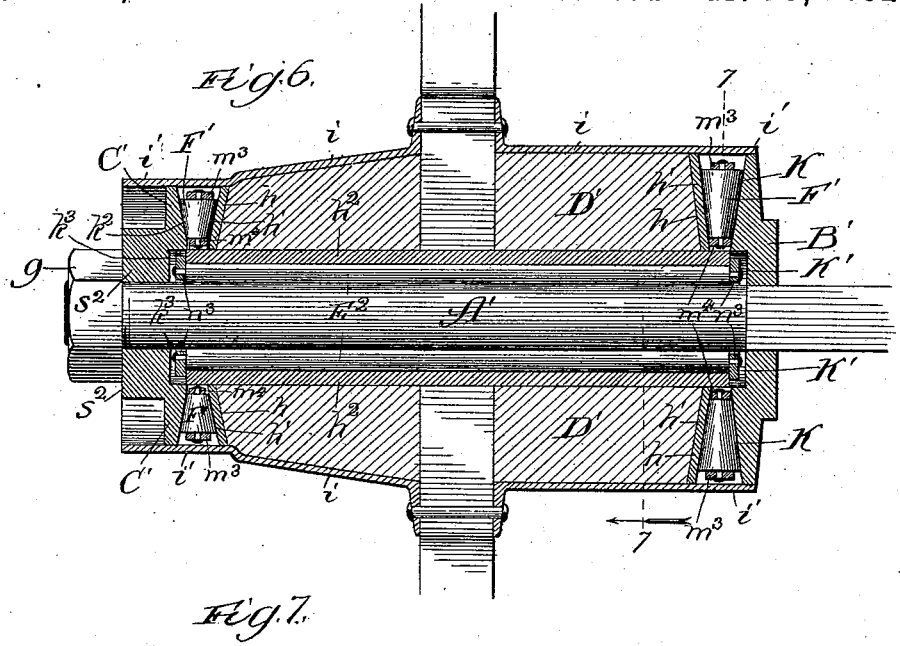

(No Model.) 2 Sheets—Sheet 1.
J. G. AMES & R. HERRMANN.
WHEEL.
No. 471,711. Patented Mar. 29, 1892.
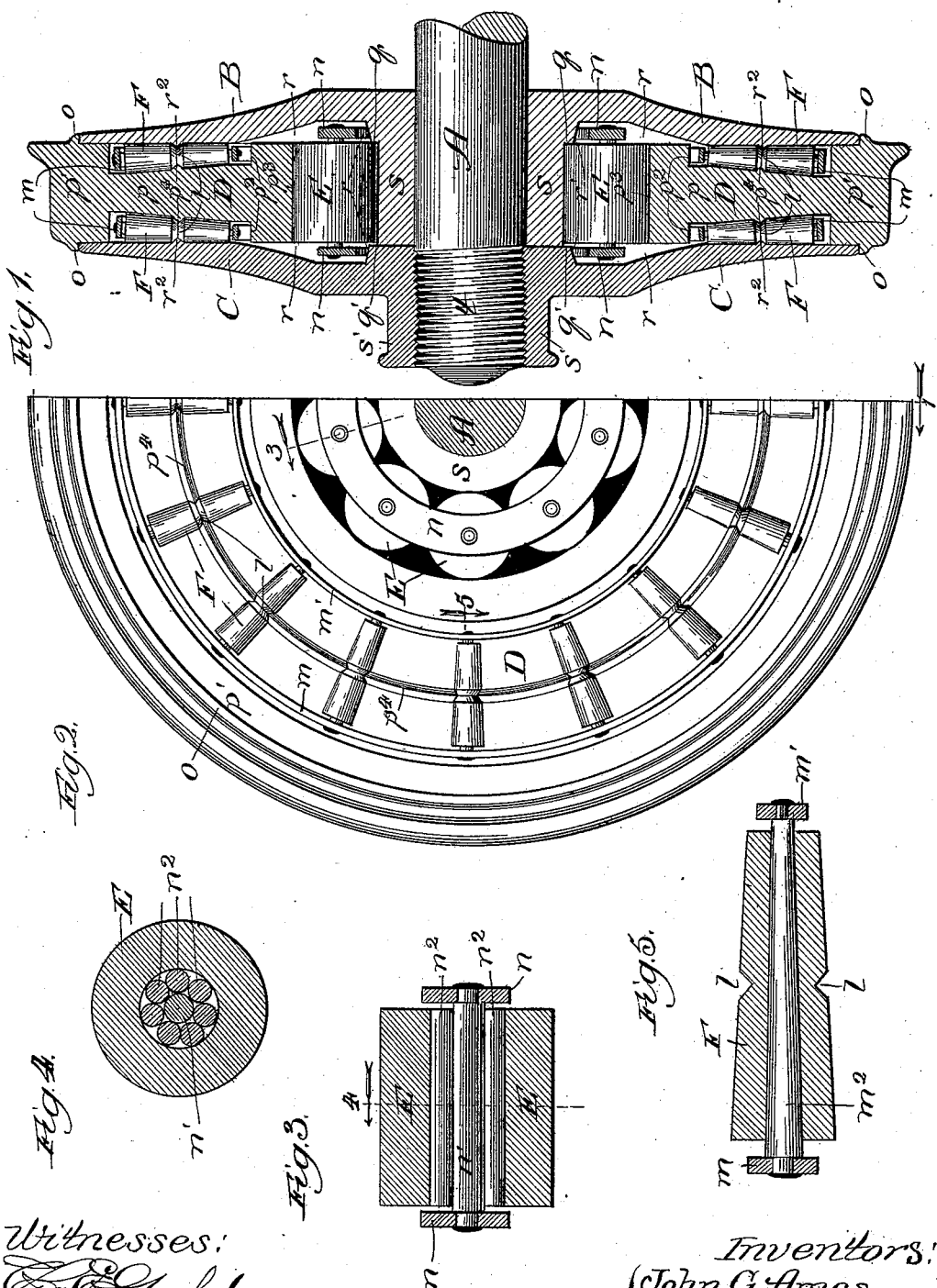
Witnesses:
Chas. E. Gaylord,
Clifford H. White.
Inventors:
John G. Ames,
Richard Herrmann,
By Dyrenforth & Dyrenforth
Attys.

(No Model.) 2 Sheets—Sheet 2.

J. G. AMES & R. HERRMANN.
WHEEL.

No. 471,711. Patented Mar. 29, 1892.

Witnesses:

Inventors
John G. Ames,
Richard Herrmann,

UNITED STATES PATENT OFFICE.

JOHN G. AMES AND RICHARD HERRMANN, OF CHICAGO, ILLINOIS.

WHEEL.

SPECIFICATION forming part of Letters Patent No. 471,711, dated March 29, 1892.

Application filed October 15, 1891. Serial No. 408,745. (No model.)

*To all whom it may concern:*

Be it known that we, JOHN G. AMES and RICHARD HERRMANN, citizens of the United States, residing at Chicago, in the county of Cook and State of Illinois, have invented a new and useful Improvement in Wheels, of which the following is a specification.

Our invention relates to an improvement in wheels, whether of the kind known as "railway-wheels" or of the kind used with road-vehicles.

The object of our invention is to produce a wheel which shall present substantially no friction in its revolution upon the axle and which shall at the same time be comparatively cheap of construction and durable in use.

We are aware that the use of roller-bearings between the moving part of the wheel and the axle has been suggested and practiced heretofore; but in all constructions with which we are acquainted employing a roller-bearing between the wheel and axle the friction which it is thought to prevent is that at the center of the wheel only. For this purpose the roller-bearings have been placed around the axle to extend parallel with the same when straight, and if the axle tapered the latter was straightened by the application of a sleeve or otherwise before the roller-bearings were applied. Moreover, in all such constructions with which we are acquainted the roller-bearings in an annular cage have been in direct contact with the axle—a construction which is found in some cases to be undesirable in wheels for railway-cars.

To the end that the foregoing objections may be removed and that friction may be prevented under all conditions in the use of the wheel, our invention consists, generally, in the combination, with a wheel, of a tapering roller-bearing or a series of tapering roller-bearings supported to revolve with a minimum of friction and introduced between the moving and stationary parts.

Our invention consists, further, in a wheel and axle, a stationary part upon the axle extending radially from the latter and at either side of the wheel, and a tapering roller-bearing or a series of roller-bearings arranged radially of the axle and having its smallest diameter at the end toward the axle, and in connection with this construction, preferably, a cage of roller-bearings straight or tapering between the movable part of the wheel and the axle to receive the centripetal pressure.

Our invention consists, further, in the preferred general and specific details of construction and combination of parts, all as hereinafter more fully set forth.

Figure 7:
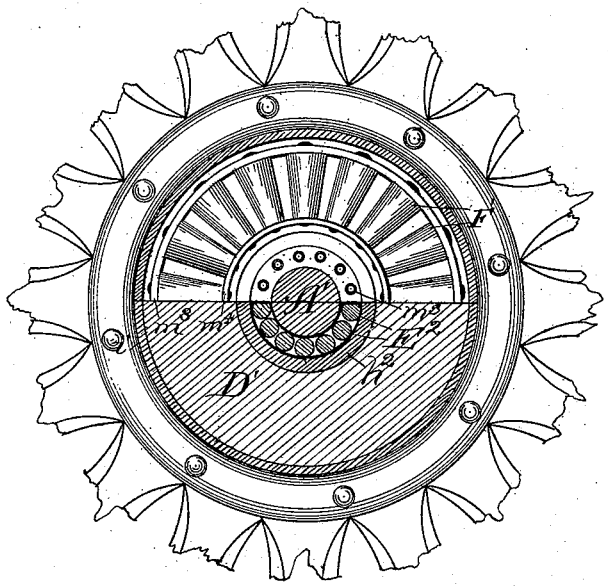

In the drawings, Figure 1 represents a central vertical section taken on the line 1 of Fig. 2 through a railway-car wheel constructed in accordance with our invention; Fig. 2, a broken side elevation of a car-wheel made in accordance with our invention, one of the plates being removed to show the interior construction. Fig. 3 is a central vertical section taken through one of the rollers near the center of the wheel on the line 3, Fig. 2. Fig. 4 is a central vertical section through one of the rollers illustrated in Fig. 3, taken on the line 4 of Fig. 3 and viewed in the direction of the arrow. Fig. 5 is a central vertical section through one of the radial rollers on the line 5 of Fig. 2. Fig. 6 is a central vertical section through a vehicle wheel, hub, and axle, showing the preferred mode of applying our invention to such a structure; and Fig. 7 is a cross-section taken on the irregular line 7, Fig. 6, and viewed in the direction of the arrow.

For the purpose of clearness of description the structure shown on the first sheet of the drawings will be described first and the structure shown on the second sheet will then be described.

A represents the axle, which is stationary by preference, and the outer extremity of which is screw-threaded, as indicated at $t$. Upon this axle is introduced a plate B, having the central bearing-ring $s$. The bearing-ring $s$ is by preference made the full length of the car-wheel center, and the attachment between the ring $s$ and axle is preferably accomplished by sweating, although, if desired, any other mode of fastening may be used. Also mounted upon the axle is an opposite plate C, having the central ring $s'$ internally screw-threaded to fit the screw-threads formed upon the extremity $t$ of the axle A. The plates B and C are of a diameter to extend from the axle almost to the flange of the wheel proper D, and are internally of substantially the same configuration throughout their surfaces from the rings $s\ s'$ to the circumference. Thus in each plate B C there is formed in the course of manufacture a recess $r$ substantially square in its lower part and having an inclined base $r'$ and narrowed to a point above the square lower part, as indicated in the drawings, and also at a point intermediate between the center and circumference with the annular V-shaped projection $r^2$. The plate B, which carries the permanent rings $s$, is provided adjacent to the rings with an annular shoulder $q$, and the inner central part of the plate C, or that which, when the parts are adjusted together, bears against the ring $s$, is of a diameter greater than that of the ring $s$, so as to present the shoulder $q'$.

The wheel D comprises an annular web $p$, carrying the tread or flange portion $p'$ and having a central aperture greater in diameter than the diameter of the ring $s$. That part of the web $p$ toward the center is broadened to present the bearing-face $p^2$ and the inner bearing-face $p^3$. The tread or flange portion of the wheel is also provided on opposite sides with annular projections $o$; but these may be omitted without detracting from the operativeness of the device. Their function is to prevent the access of dust between the plates B C and the wheel.

Between the wheel D and the ring $s$ is introduced a cage of roller-bearings E, this cage being composed of opposite rings $n$, extending between which are rollers E, each roller having a diameter equal to the distance between the face $p^3$ of the web and the outer face of the ring $s$, the dimension of the rollers E being the same and the latter being arranged to fill the annular space around the rings $s$ and inside of the web without, however, touching each other. It is preferable to make the rollers E in the form illustrated in Figs. 3 and 4—that is to say, an axle $n'$ extends from one ring to the other, and around this are arranged rollers $n^2$, to receive which the roller E is centrally bored, as indicated in the figures. It is to be understood that the diametrical space between the roller E and the axle $n'$ is entirely filled by the rollers $n^2$, and that the latter are arranged contiguous to each other in a complete circle. The rings $n$ are supported out of contact with the inclined faces $r'$, formed, as before described, on the interior of the plates B and C.

The web $p$ is given a tapering form in cross-section—that is, made broader toward the center than toward the flange—and is provided on each face with an annular V-shaped projection $p^4$, the location of this annular projection $p^4$ being exactly opposite the corresponding projection $r^2$, formed on each plate B and C. On each side of the web $p$ is supported a cage of tapering rollers, the details of the construction of which are as follows: Concentric rings $m\ m'$ are perforated at intervals, said perforations being opposite to each other on a radial line, and extending between the rings at the various perforations are tapering rollers F, each of which is provided at a middle point with the V-shaped circumferential groove $l$ of the configuration given to the annular projections $r^2$ and $p^4$, previously described. The rollers F are wider at their outer extremity than at the inner, and the taper is substantially the same as that given to the web $p$ before described. It may be desirable to construct the rollers F with the axial rollers employed with the rollers E, which construction would be included in our invention, and it may also be desirable to mount them directly upon a tapering axle, as represented at $m^3$, Fig. 5, and said construction may prove desirable; but we do not limit our invention thereto. The dimension of the rollers F is such as to fill entirely the space on an annular line between the web $p$ and the adjacent plate B or C, and they are adjusted in position so as to be supported entirely by the engagement of the projections $r^2\ p^4$ with the groove $l$, the opposite rings $m\ m'$ being entirely out of contact with the surface either of the wheel D or of the plates B C. By giving to the rollers a taper on a radial line they are caused to move in a perfect circle under the revolution of the wheel, thus offering no obstruction, frictional or otherwise, to the movement of the latter between the plates B C.

The operation is as follows: The plate B is first applied to the axle, preferably by sweating on the ring $s$. The cage of roller-bearings E, extending parallel with the axle, is thereupon introduced, and then the wheel D, upon which is first supported the inner cage of rollers F. The outer cage of rollers F is then introduced, and the plate C is then applied to the screw-threaded part $p$. By reason of the construction shown the plates B and C are stationary, and the wheel D revolves upon the central rollers E and lateral rollers F, the latter, by reason of their tapering diameters, following a perfect annular line in their movement on the common center, while each revolves independently upon its own axis furnished by the axle $m^2$. A similar movement—viz., a revolution on a common center as well as an independent revolution on its axis, as obtained in the rollers E. It is quite apparent that at all points where a moving part comes in contact with a stationary part a roller-bearing surface is presented, thus absolutely avoiding all friction, that the parts are easily adjusted together, and that by reason of the economy in the number of parts the highest economy practicable with the improvement in result is obtained in this invention.

In applying the invention to a carriage-wheel a substantial identity of construction obtains so far as relates to the introduction of roller-bearings; but it is desirable, though not essential, that the hub of the wheel be altered somewhat, as will presently appear.

On the stationary axle $A'$ is sweated or otherwise firmly secured a plate $B'$, having preferably the inclined inner face $k$ and central circular recesses $k'$. The hub $D'$ is centrally bored to have an internal diameter greater than the axle, but of uniform diameter from end to end. It is desirable that the hub shall be metal-bound, as by surrounding it with a metal sheet $i$, extending laterally beyond the hub to furnish a dust-guard $i'$. The lateral extremities of the hub $D'$ may be square, but are preferably inclined, as shown at $h$, and provided or not with an annular plate of metal $h'$. Between the axle $A'$ and the hub $D'$ is introduced a cage of roller-bearings $E^2$, consisting, as before, of rings $n^3$, between which are extended rollers $E^2$, each upon its own axis and out of contact with each other. If the axle $A'$ be tapering, then the rollers $E^2$ are caused to taper to correspond, thereby at all times to fill the space on a radial line between the axle and the hub. To produce an opposite bearing a tube $h^2$ may be introduced in the hub to revolve therewith. At the opposite extremity of the axle $A'$ is applied a plate $C'$, having the inner inclined face $k^2$ and central ring-shaped body $s^2$. The ring and plate $C'$ are recessed in their inner faces, as indicated at $k^3$, in the same manner that the plate $B'$ is provided with the recess $k'$, the purpose of the two recesses $k'$ and $k^3$ being to receive the rings $n^3$ of the cage of rollers $E^2$. The plate $C'$ with its ring is held in position upon the axle $A'$ by a nut $g$, as shown. Between the lateral edges of the hub and the adjacent faces of either plate $B'$ $C'$ are introduced rollers $F'$, tapering so as to be broader at the outer end than at the inner, and held between rings $m^3$ $m^4$ in the same manner as the tapering rollers F are held when introduced between the web of the car-wheel D and the adjacent face-plates before described. The plates $h'$ are provided to furnish bearing-surface for the rollers, and if it be not desired to bevel the edges $h$ they may be made straight, the bevel on the plates $B'$ $C'$ being increased to correspond. As it is usual that the inner end of the hub is of greater diameter than the outer end, the rollers $F'$, applied at these ends, respectively, will be of different lengths, but otherwise are exactly the same.

While we have described, specifically, a structure fitted for railway-wheels and for carriages, it is apparent that the invention may be applied with success to all kinds of wheels in which it is desired that their motion on their axes shall be effected without friction.

What we claim as new, and desire to secure by Letters Patent, is—

1. The combination, with an axle having the face-plate C and the face-plate B and ring $s$, said ring forming an annular bearing around the axle between the face-plates, of a wheel having lateral bearing-surfaces and central bearing-surface, rollers arranged around the ring $s$ within the wheel, and tapering rollers arranged between the lateral bearing-surfaces of the wheel and the face-plates adjacent thereto, substantially as described.

2. The combination, with an axle carrying face-plates on opposite sides of the wheel and the central ring carried by a face-plate and immovable upon the axle and with the wheel mounted to revolve upon the axle between the face-plates, of a series of horizontal rollers between the axle-face of the wheel and the ring, and a set of roller-bearings between each face of the wheel and the adjacent face-plate, comprising radially-arranged rollers supported to maintain their relative relation to each other and permitted to revolve on a common center as well as axially, substantially as described.

3. The combination, with an axle and face-plates arranged thereon on opposite sides of the wheel, of a wheel made tapering in thickness at a point between the center and periphery, and tapering roller-bearings arranged radially in a complete circle and applied to the tapering part of each wheel on both faces, substantially as described.

4. The combination, with an axle having face-plates B C, supported on opposite sides of the wheel, each having annular projections $r^2$, of a wheel mounted to revolve around the axle and having in its web portion annular projections $p^4$, and tapering roller-bearings radially arranged on each side of the wheel and having the annular groove $l$ to engage the projections $r^2$ $p^4$, substantially as described.

5. The combination, with an axle A and the face-plates carried thereby on opposite sides of the wheel, of a wheel supported to revolve upon the axle, tapering roller-bearings between the wheel and axle capable of revolving upon a common center as well as axially, and radially-arranged tapering roller-bearings on each side of the wheel capable of revolving on a common center as well as axially and supported to be maintained between the sides of the wheel and the face-plates, substantially as described.

6. The combination, with an axle, of face-plates immovably mounted upon the axle on opposite sides of the wheel, each plate having an annular cavity in its inner face to receive the end rings of a cage of horizontal rollers and presenting in the remainder of the inner face a bearing-surface for radially-arranged conical rollers, a wheel revoluble between the face-plates and having the beveled sides affording bearing-surfaces for the radial rollers, and a cage of roller-bearings around the axle and within the wheel, the rings therefor located within the cavities in the face-plates, substantially as described.

7. The combination, with an axle and a wheel thereon, of a series of rollers parallel with and surrounding the axle within the wheel and affording an axial bearing for the latter, each roller comprising, in combination, a shaft $n'$, longitudinal parallel rollers $n^2$ out of contact with each other and surrounding the shaft, and a roller E, having the central aperture to receive the rollers $n^2$ and shaft, substantially as described.

JOHN G. AMES.
RICHARD HERRMANN.

In presence of—
M. J. FROST,
A. P. COBB.